SYNCHRONIZING CIRCUITS FOR REMOTE CONTROL SYSTEMS

Filed Aug. 10, 1954 4 Sheets-Sheet 1

INVENTOR.
Field Curry.
BY W. L. Stout.
HIS ATTORNEY

Aug. 9, 1955 F. CURRY 2,715,218

SYNCHRONIZING CIRCUITS FOR REMOTE CONTROL SYSTEMS

Filed Aug. 10, 1954 4 Sheets-Sheet 2

Aug. 9, 1955 F. CURRY 2,715,218

SYNCHRONIZING CIRCUITS FOR REMOTE CONTROL SYSTEMS

Filed Aug. 10, 1954 4 Sheets-Sheet 3

INVENTOR.
Field Curry.
BY W. L. Stout
HIS ATTORNEY

United States Patent Office 2,715,218

Patented Aug. 9, 1955

2,715,218

SYNCHRONIZING CIRCUITS FOR REMOTE CONTROL SYSTEMS

Field Curry, Edgewood, Pa., assignor to Westinghouse Air Brake Company, Wilmerding, Pa., a corporation of Pennsylvania Application August 10, 1954, Serial No. 448,796

11 Claims. (Cl. 340—163)

Figure 1:
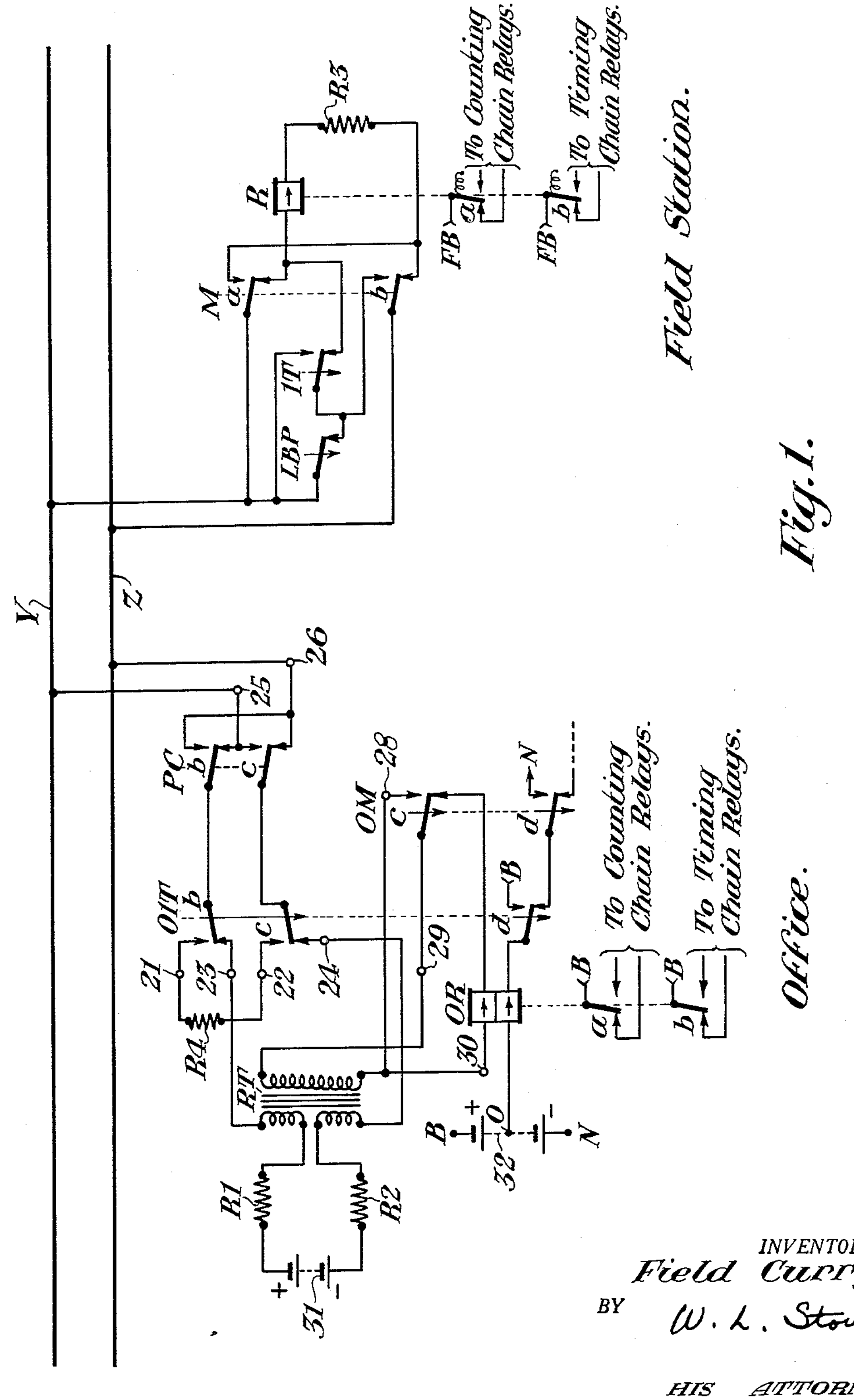

My invention relates to synchronizing circuits for remote control systems and more particularly to such synchronizing circuits as applied to centralized traffic control systems for railroads. The systems to which my invention may be applied comprise an office and a plurality of stations connected by a communication channel over which impulse code signals are transmitted to effect the operation of devices, mostly for governing traffic, which are located along the trackway and to indicate at the office the position or condition of such devices.

My invention is an improvement on the system disclosed in the copending application for Letters Patent of the United States, Serial No. 382,885, filed September 29, 1953 by A. B. Miller, for a Remote Control System, now Patent No. 2,698,425, dated December 28, 1954. The system of my invention is also related to or an improvement on the systems shown in Letters Patent of the United States, No. 2,411,375 and No. 2,442,603, issued November 19, 1946, and June 1, 1948, respectively, to A. P. Jackel, each for a Remote Control System. My invention is further an improvement on the control system disclosed in Letters Patent of the United States No. 2,350,668, issued June 6, 1944, to G. W. Baughman and N. F. Agnew for a Remote Control System. The remote control systems to which my invention is applied are thus of the time code type employing codes of long and short elements which are transmitted one at a time over a single communication channel.

The components of the systems to which my invention may be applied are preferably assembled in the form of coding, storage, and extension units, each containing a group of relays. Such systems employ a station coding unit at each field location for transmitting indication codes and for selectively receiving control codes, together with extension and/or storage units as required, for associating the devices at that location with the station coding unit. The office preferably includes an individual control panel for each unit group of controlled traffic governing devices and an office coding unit which is connected over a line circuit or other communication channel with the station coding unit to establish communication selectively between each panel and the corresponding station unit.

Remote control systems of this type are generally adapted to transmit either direct current coded pulses or high frequency carrier current coded pulses from the office to the field station for the control of the various devices and from the field stations to the office to indicate the condition of these devices. When coded direct current pulses are used, the control of the field station by the office is in a direct manner, that is, no intervening auxiliary station is required. The direct current code pulses are transmitted from the office and are received directly by the coding units at the field sttaions. However, when carrier currents are used, it is necessary to have an auxiliary or remote line station between the office and the field stations controlled by that particular office coding unit. The remote line station receives and translates the carrier current code pulses into the usual direct current code pulses which then are used to control the field stations. Indications from the field station to the office are transmitted in the reverse manner, that is, from the field station to the remote line station by the usual direct current code pulses and from the remote line station to the office by carrier current code pulses. A system of this latter type is shown in the previously mentioned Patent 2,350,668. Another system of this type is also described in Manual No. 507, entitled Coded Carrier Control System for use with a Time Code Control System, revised and reprinted in March 1947, by the Union Switch & Signal Division of Westinghouse Air Brake Company.

However, in any system of this type, a method of synchronizing the coding action at the office and station locations is necessary, especially during the transmission of an indication code. Such synchronizing action assures that the coding units at all locations reset to their normal at-rest positions simultaneously. This prevents the coding action between office and station locations from being out-of-step during following codes. Such out-of-step coding action generally results in the incorrect registration of the control functions or the indications. This synchronizing action is especially necessary in case the coding action is halted or interrupted by some equipment or communication channel fault. In this case, the resetting to normal of all of the equipment at the various locations must be very carefully synchronized so that each coding unit returns to its at-rest condition at substantially the same time. The problem of synchronizing the system is particularly acute in carrier controlled sections, since this type of code control is inherently more sensitive to faults and other external actions which affect the communication channel than are the direct current code controlled sections.

In the remote control systems in present use, different methods of synchronizing are used depending upon whether the control is by direct current pulses or by carrier current pulses. In the later case, relays external to the office coding unit are used to provide the synchronizing action, as is illustrated in the previously mentioned Manual 507. However, this present system is not always satisfactory, particularly because it requires additional relays which cannot be mounted in the coding units. A system which does not require these external relays would thus have considerable advantage over the present system.

An object of my invention, therefore, is to provide a new and better synchronizing means for remote control systems of the type here described.

Another object of my invention is to provide a synchronizing means for such remote control systems which eliminates the requirement for synchronizing relays external to the coding unit at the office location.

A further object of my invention is to provide a synchronizing means which operates, without change in the furnished equipment, on either a direct current controlled line or a carrier current controlled line.

Another object of my invention is to provide synchronizing circuits within the office coding unit of a remote control system which, in case of a fault, will assure that all line relays have operated to their reverse positions prior to the simultaneous resetting of these line relays to their normal positions.

A still further object of my invention is to provide normal synchronizing circuits at the office location of a remote control system which will result in identical action at the field station locations during the synchronizing process whether the code pulses are of direct current or carrier current.

Other objects and features of my invention will be apparent from the following description when taken in connection with the accompanying drawings.

As has been previously indicated, in any of these remote control ssytems, whether the codes are transmitted by direct current pulses or by carrier current pulses, if an out-of-synchronism condition occurs, it is a requirement that all of the line relays be reset simultaneously to their normal position. It has been found best to first set all of these line relays to their reverse position, if not already occupying that position, and then to allow sufficient time for the coding equipment at each location to reset under this reverse condition. Then all of the line relays are simultaneously set to their normal position and the coding equipment is allowed to reset in the normal manner to its usual, at-rest condition. This normal reset action synchronizes the system so that all coding units are in condition for further coding action at substantially the same time. My invention follows this general method of synchronizing such a remote control system.

However, as previously indicated, the systems in present use have different circuits and equipment at the office for synchronizing depending upon whether the code pulses are of direct current or carrier current. In my invention, all of the synchronizing circuits are in the office line coding unit and function in a generally similar manner regardless of whether direct current or carrier current control is used. By making the proper connection to the terminals provided on the coding unit, the synchronizing circuits may be established for either direct current or carrier current systems.

For example, in my invention, if a code stalls with the office line relay in its normal position, a lock-out and synchronizing relay is energized through the synchronizing circuits established. This in turn energizes a first transmitter relay. When this first transmitter relay is energized and picks up, the office line relay is driven to its reverse position and, if direct current code pulses are being used, the line circuit is opened.

The opening of the direct current line circuit causes all of the station line relays to operate to their reverse position if they are not already in that position. Sufficient time is then allowed for the timing chain relays in the various coding units to drop out under this reverse condition. At the office, this releases the lock-out and synchronizing relay and the first transmitter relay. Release of these relays drives the office line relay to its normal position and closes the line circuit. The closing of the line circuit drives all of the station line relays to their normal position at substantially the same time as the office line relay. The office and the various station locations are then allowed to reset to their normal at-rest condition, thus synchronizing all the coding units on the line circuit.

If a carrier current system is in use, the pick up of the first transmitter relay causes carrier current to be transmitted over the communication channel. This carrier current causes the opening of the remote direct current line which results in all station line relays operating to their reverse position. The timing chain relays in all coding units then drop-out under this reverse condition. As described above, at the office this results in the release of the first transmitter relay which in turn causes the suppression of the carrier current. The remote direct current line circuit is again closed, and all station line relays operate to their normal position at substantially the same time as the office line relay. The normal reset action of all coding units to the at-rest condition then occurs in synchronism.

If, in the system of my invention, a code stalls with the office line relay reversed, the dropping out of the timing chain relays in the office drives this office line relay to its normal position. The timing chain relays and the rest of the office coding equipment then reset to their normal at-rest condition. If a direct current line circuit is in use, the synchronizing circuits cause the line circuit to be reenergized with the normal polarity to place all of the field line relays in their normal position at substantially the same time as the office line relay. The timing chain and the rest of the equipment at each of the field stations then resets to its normal, at-rest condition in synchronism with the office equipment. If a carrier current line circuit is in use, the normal synchronizing circuits of my invention cause a short pulse of the carrier current to be transmitted over the communication channel to reverse all of the station line relays. This very short pulse of carrier current is then interrupted to close the remote direct current line circuit, placing all of the station line relays in their normal position substantially at the same time as the office line relay occupies its normal position. The equipment at the field stations then resets to its normal condition in synchronism with the office equipment.

I shall now describe one form of the synchronizing circuits of my invention in connection with the accompanying drawings and shall then point out the novel features thereof in the claims.

Referring now to the drawings, Fig. 1 is a diagrammatic view of a direct current line circuit showing the office line circuit connections and the line circuit connections at one field station.

Figure 2:
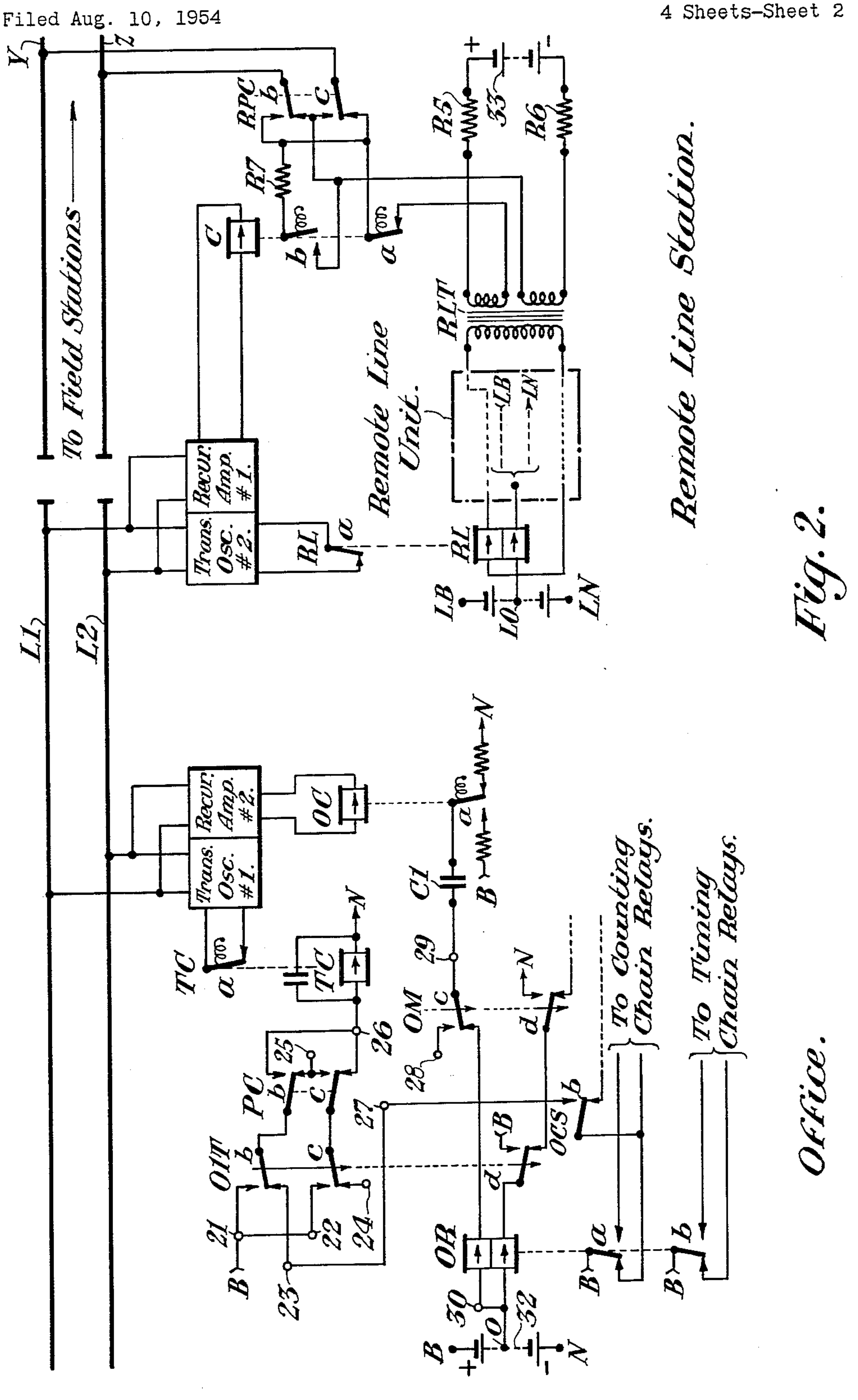

Fig. 2 is a diagrammatic view of a carrier current line circuit with the office line circuit connections and the line circuit connections at the remote line station, including the connections at this remote line station to the remote direct current line circuit extending beyond to the field stations.

Figure 3A:
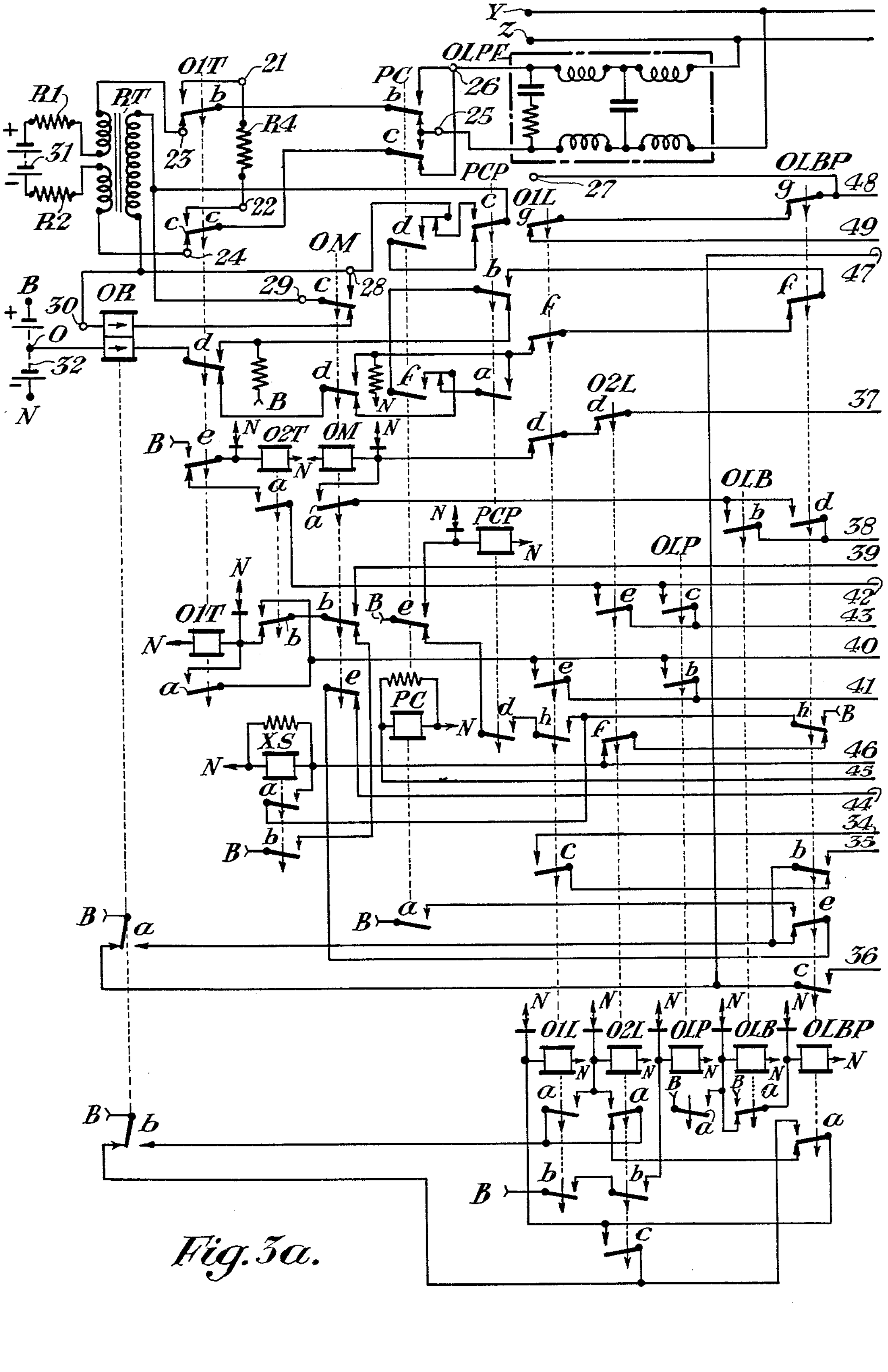
Figure 3B:
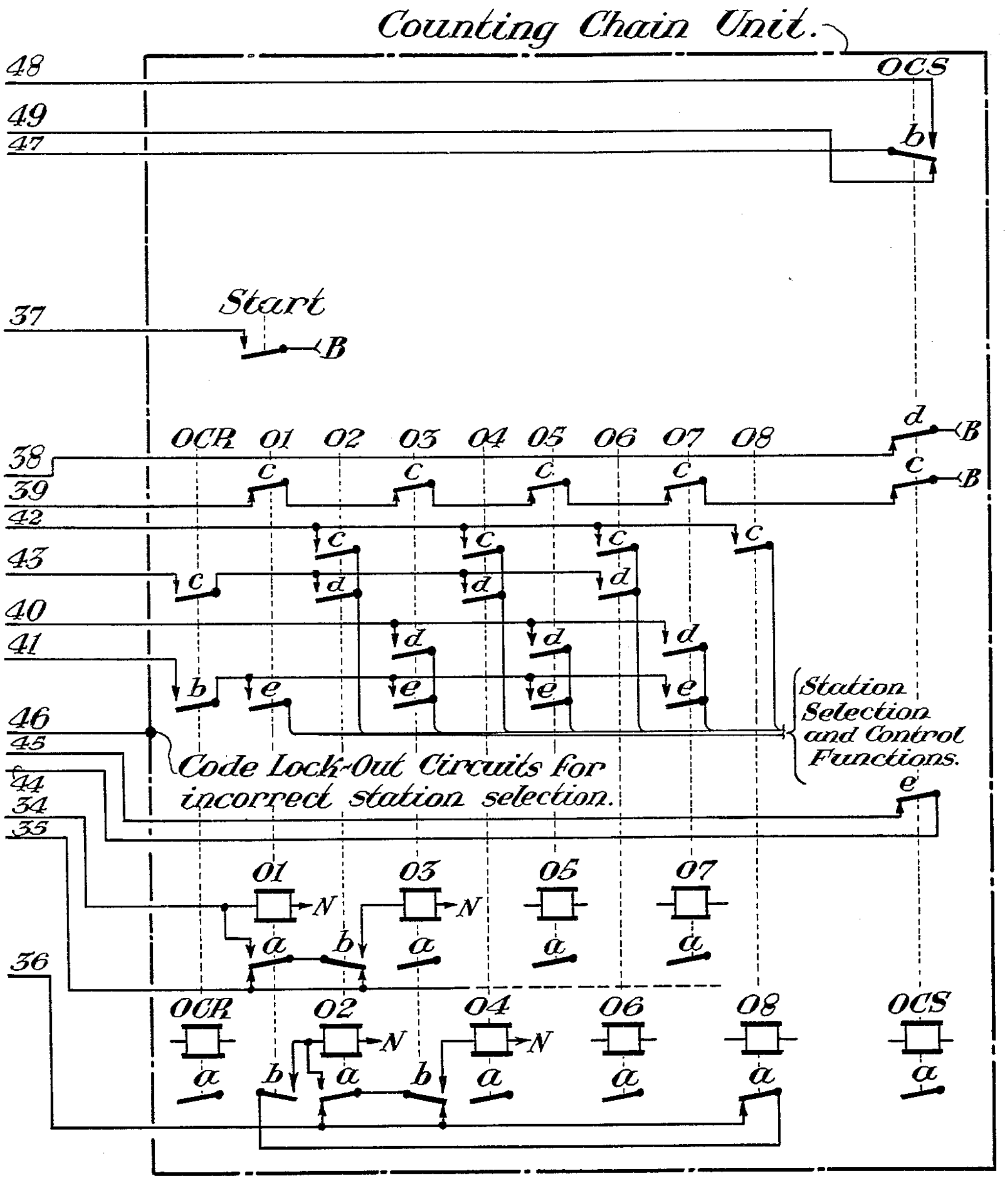

Figs. 3*a* and 3*b*, when taken together with Fig. 3*a* on the left, are a diagrammatic view of the office coding equipment showing in detail the novel synchronizing circuits of my invention.

In each drawing similar reference characters refer to similar parts of the apparatus.

In each of the drawings the remote control system to which the novel synchronizing circuits of my invention have been applied is that system shown in the previously mentioned Patent No. 2,698,425. Where the details of the remote control system do not pertain to my invention, the apparatus is shown in conventional form, and reference is made to Patent No. 2,698,425 for a complete description of the system operation. However, in the drawings of the present application, where details of the remote control system necessary for an understanding of my invention are shown, the reference characters used for the various relays, resistors, transformers, and other parts of the apparatus are similar to those used in the afore mentioned Miller patent in order to provide a point of correspondence when referring to the prior system.

Referring now to Fig. 1, there is shown therein a typical direct current line circuit for such a remote control system. At the office location to the left of the drawing, the line connections are shown which are necessary for transmitting the control codes and for receiving the indication codes over the line wires. At the one field station illustrated at the right of the drawing, the similar connections to the line wires are shown for receiving the control code from the office and for transmitting the indication codes from that station to the office.

The reference characters Y and Z designate a pair of line wires which extend from the office location to the several field stations. These two line wires provide the line circuit for the remote control system of my invention and also may be used to provide channels for telephone and telegraph communication as explained in connection with the similarly designated line wires shown in the previously mentioned Patent No. 2,698,425. This line circuit as shown is normally energized by current from the office line battery 31. The positive terminal of this line battery is normally connected to the line wire Y and the negative terminal to the line wire Z over the back contacts *b* and *c* of the office first transmitted relay O1T and the similar contacts of the office line pole-changing relay PC. The line circuit also includes the office line resistors R1 and R2 and the primary windings of an impulse transformer RT by means of which the office line relay OR is controlled when the office is receiving indication codes. Control codes are transmitted by periodically opening and closing the line circuit due to the periodic operation of relay O1T to open and close its back contacts *b* and *c*. A resistor R4 is connected between the front contacts *b* and *c* of relay O1T to bleed any electrostatic charge from the line during the period that relay O1T has opened the line circuit. Various terminals 21 to 26, inclusive, are included in the office line circuit connections as shown in Fig. 1. The utility of these terminals will appear hereinafted during the description of the line connections for the carrier current line circuits.

At the field station, the line circuit connection may be traced from the normally positive line wire Y through back contact *a* of the master relay M, the winding of line relay R, registor R3, and back contact *b* of relay M to the line wire Z. Relay R is a biased relay and is operated by the pulses of a control code between its normal and reverse positions. Normally, during the at-rest condition of the system, that is, when no coding is taking place, this relay occupies its normal position. The operation of relay R controls the station line coding unit over its contacts *a* and *b* in a manner which was fully explained in the previously mentioned Patent No. 2,698,425 and which is not part of my invention. Indication codes are transmitted from the field station by operation of the first transmitter relay 1T which periodically closes its front and back contacts to alternately shunt the line circuit and close the line circuit through relay R. As is common in such remote control systems, the master relay M at the field station is operated at the beginning of an indication code to pole-change the line circuit connections by opening its back contacts *a* and *b* and closing the corresponding front contacts. Initially, upon operation of relay M, the line circuit is shunted over front contact *b* of relay M and a back contact of one of the timing relays LBP. Relay LBP, however, is shortly thereafter energized and remains picked up during most of the indication code so that relay 1T may perform the necessary coding operation.

At the office, the office line relay OR is operated during an indication code through the impulse transformer RT. Transformer RT is responsive to the changes in the line current produced by the periodic shunting and closing of the line circuit by the transmitter relay 1T at the station sending the indication code. The circuit through which relay OR is controlled may be traced from the top terminal of the secondary winding of transformer RT through terminal 29, back contact *c* of relay OM, the upper winding of relay OR, and terminal 30 to the lower terminal of the secondary winding. Relay OR is of the magnetic stick type so that the pulses of current in alternate opposite directions from the secondary winding cause this relay to alternately operate between its normal and its reverse positions. This operation of relay OR controls the office line coding unit through the operation of its contacts *a* and *b*, which operation will be more fully discussed hereinafter. During control codes, the secondary of transformer RT is shunted by the front contact *c* of relay OM which is closed at that time so that the pulses of current in the secondary winding have no effect upon relay OR. Relay OR is controlled during control codes over contacts *d* of relays O1T and OM. This operation of relay OR between its normal and reverse positions during any control code is necessary in order to step the office line coding unit through the required number of steps for that control code. The circuit for operating relay OR to its normal position during a control code may be traced from the center tap terminal O of a local battery 32, which has a positive terminal B and a negative terminal N, through the lower winding of relay OR, back contact *d* of relay O1T, and front contact *d* of relay OM to terminal N of the source. During the code steps that relay O1T is energized, the operating circuit is traced from terminal B over front contact *d* of relay O1T through the lower winding of relay OR to terminal O. It is to be seen that the flow of current in these two operating circuits through the lower winding of relay OR is in opposite directions so that the relay is alternately operated to its normal and reverse positions and the corresponding operation of its contacts *a* and *b* step the line coding unit through the steps of the code.

Referring now to Fig. 2, there is shown in this drawing a typical carrier current line circuit section with the office and its line circuit connections and the remote line station and its connections both to the carrier section of the line and the corresponding remote direct current line circuit extending beyond that point. Communication between the office and the remote line station is over the line wires L1 and L2 by means of two high frequency carrier currents.

While in Fig. 2 the transmission medium for the carrier currents shown, for simplicity, as two line wires, it is to be understood that such systems are not so limited. Other means for transmitting the coded carrier currents, such as radio or a duplex channel obtained in a standard telephone or telegraph carrier system, may be used. The use of such other communication channels between the office and remote line station is to be considered as contemplated in remote control systems utilizing the synchronizing circuits of my invention.

Each carrier current channel consists of an oscillator-transmitter unit at the originating end, the communication channel, here shown as two line wires, and the receiver-amplifier at the receiving end. For example, the control codes are transmitted by carrier current from the oscillator-transmitter No. 1 at the office to the receiver-amplifier No. 1 at the remote line station. The oscillator-transmitter No. 2 and the receiver-amplifier No. 2 comprise a corresponding channel in the opposite direction for the indication codes. Since the internal circuits of the oscillator-transmitters and the receiver-amplifiers form no part of my invention, these units are shown in a conventional manner by block diagram and reference is made to the aforementioned Manual 507 for the internal circuitry of these units. Each oscillator is normally suppressed, that is, the carrier frequency current is not transmitted. At the office the reverse contact *a* of the carrier transmitter relay TC shunts the oscillator. Relay TC is a biased relay and, being normally deenergized, its reverse contact *a* is normally closed. It will be noted that relay TC is controlled over circuits used for the line connections in a direct current installation. For example, relay TC may be energized over the circuit traced from terminal B of the local battery source through terminals 21 and 22, front contact *c* of relay O1T, back contact *c* of relay PC, terminal 26, and the winding of relay TC to terminal N of local battery source. It is to be seen, then, that during coding operation of relay O1T, relay TC correspondingly is periodically operated between its normal and reverse position. The other principal circuit for controlling relay TC, in order to transmit a reset pulse at the end of an indication code, may be traced from terminal B over normal contact *a* of relay OR, front contact *b* of a code stopping relay OCS, terminal 27, terminal 23, back contact *b* of relay O1T, front contact *b* of relay PC, terminal 26, and the winding of relay TC to terminal N. Other control circuits for relay TC which have peculiar purposes will be discussed hereinafter in connection with the detailed description of the synchronizing circuits of my invention.

The control carrier current pulses produced by the operation of relay TC are received through the receiver-amplifier No. 1 by the carrier receiving relay C at the remote line station. Relay C, which is a biased relay, is normally deenergized and thus normally occupies its reverse position. It is periodically operated to its normal position as a result of each pulse of carrier current received from the office. The direct current line circuit extending beyond the remote line station to the various field stations is controlled by relay C in a manner similar to the control exercized by transmitter relay O1T on the direct line current circuit shown in Fig. 1. In other words, the remote direct current line circuit, including the pair of line wires Y and Z, shown in the right hand portion of the Fig. 2 is normally supplied with direct current from a line battery 33 located at the remote line station. The positive terminal of battery 33 is connected to line wire Y through resistor R5, a primary winding of an impulse transformer RLT, reverse contact *a* of relay C, and back contact *c* of the remote line pole-changing relay RPC. Line wire Z is normally connected to the negative terminal of line battery 33 through resistor R6, another primary winding of impulse transformer RLT, and back contact *b* of relay RPC. It is seen therefore that as relay C periodically operates due to the pulses of carrier current received from the office, the opening of its reverse contact *a* opens this remote line circuit periodically to form the control code which is received by the various field stations. A resistor R7 is connected across line wires Y and Z during the open period of the line circuit by the closing of normal contact *b* of relay C. This operation bleeds any electro-static charge from the line circuit during the open period of the code.

Indication codes transmitted by any of the field stations connected to the remote direct current line circuit terminating at this remote line station are received by the remote line relay RL through the impulse transformer RLT in a manner similar to the operation of the office line relay OR through the impulse transformer RT as discussed in connection with Fig. 1. Relay RL is of the magnetic stick type as is the office line relay and is alternately operated between its normal and reverse positions during an indication code by pulses of current from the secondary of the impulse transformer. These pulses of current result from the change in the line current in the remote direct current line circuit due to the coding action in any of the field stations. The oscillator-transmitter No. 2 at this remote line station is normally suppressed by normal contact *a* of relay RL. Operation of relay RL between its normal and reverse position causes periodic pulses of the second frequency carrier current to be transmitted to the office location. Relay RL is also controlled through the remote line unit, which is shown conventionally in Fig. 2 by the dot-dash square located between impulse transformer RLT and relay RL. The circuits in the remote line unit form no part of my invention and reference is made to the aforementioned Manual 507 for full description to their operation. It is sufficient herein to state that the remote line unit relays and associated circuits provide for pole-changing the remote direct current line circuit during indication codes, stabilizing relay RL during control codes, and restoring normal polarity to the remote direct current line circuit at the end of an indication code even though no carrier reset pulse is received from the office. This latter action, of course, includes the resetting of relay RL to its normal position which it occupies during the at-rest condition of the system.

The pulses of carrier current transmitted by the remote line station are received at the office location by receiver-amplifier No. 2 and result in the operation of the office carrier receiving relay OC in a manner similar to the operation of relay C at the remote line station. Relay OC is also a biased relay normally deenergized and therefore occupying its reverse position. During the receipt of carrier current pulses by receiver-amplifier No. 2, relay OC operates its contact *a* between its normal and reverse positions. This operation in turn causes relay OR to be operated in a similar manner between its reverse and normal positions, respectively. The circuit for this may be traced from terminal O of local battery 32 through terminal 30, the upper winding of relay OR, back contact *c* of relay OM (closed during indication codes), terminal 29, a condenser C1, and either reverse contact *a* of relay OC to terminal N or normal contact *a* of relay OC to terminal B. It is obvious that relay OR is thus operated between its normal and reverse positions by pulses of direct current through its upper winding in alternate opposite directions. This operation of relay OR and the corresponding movement of its contacts *a* and *b* between their normal and reverse positions causes the office line coding unit to receive the indication code in a manner, typical to such remote control systems, which will be further described hereinafter. Reference is also made at this time to Patent No. 2,698,425 hereinbefore mentioned, which fully describes the receipt of an indication code by an office line coding unit.

With the preceding brief review of the operation of a coded remote control system with each type of code pulses, I shall now describe one form of my invention. Referring to Figs. 3*a* and 3*b*, there is shown therein a portion of the office line coding unit for the remote control system as disclosed in Patent No. 2,698,425. In these drawings, detailed circuits are shown only when they form part of, or are necessary for, an understanding of my invention.

Certain other portions of the office line coding unit, for example, the relay counting chain, are shown in a conventional manner. However, the circuits for the control functions, the station selection, and the indication registry are not shown since they form no part of my invention and are not needed for an understanding of it. For this part of the office line coding unit, reference is again made to the previously mentioned Miller patent.

In Fig. 3*a*, the line connections from the office line coding unit are shown for a direct current line circuit similar to that previously discussed in connection with Fig. 1. It is obvious that the line connections could be for a carrier current line circuit as was discussed in connection with Fig. 2 and reference will be made to such line circuit connections for full understanding of my invention. In the line circuit connections as shown in Fig. 3*a*, a low pass filter OLPF has been added between terminals 25 and 26 and the connection to line wires Y and Z. This filter is shown in the form generally used in such systems in order to permit the joint use of the pair of line wires by other communication channels.

In each control code formed by the office transmitter relay O1T, which in a direct current system interrupts or opens the line circuit, the line circuit is open during each odd numbered code step and closed during each even numbered step. In a carrier line circuit, the oscillator transmitter, which is indirectly controlled by relay O1T, is unsuppressed during each odd numbered step to transmit a pulse of carrier current and is suppressed during each even numbered step so that no carrier current flows in the line circuit. The character of each transmitted pulse, that is, whether it forms a short or long code step, is thus determined by the interval of time during which the first transmitter relay O1T is either picked up or released. More particularly, the office coding unit is placed in condition to transmit a control code by energizing the master relay OM which in turn completes circuits for effecting the periodic operation of the associated transmitter relay O1T.

Relay O1T is alternately picked up and released to produce short code steps by back contacts of the odd numbered counting chain relays connected in series. As will be explained shortly, the long odd numbered code steps are produced by holding relay O1T picked up by various stick circuits. To assist in the timing of the code pulses, a second transmitter relay O2T is used. Relay O2T is picked up when relay O1T picks up. Once released, relay O1T cannot pick up again until relay O2T releases. Thus the timing of the even numbered pulses is determined by the release of relay O2T, which is held up by stick circuits similar to those for relay O1T to produce the long even numbered code steps.

When relay O1T picks up at the start of any control code, the office line relay OR is energized in such fashion as to cause this relay to operate to its reverse position. Closing of the reverse contacts of relay OR activates the timing and counting chain relays. Relay OR, of course, operates alternately during a control code to its reverse and normal positions each time relay O1T picks up or releases, respectively. Thus relay OR steps along the counting chain relays to advance the coding action. This action of relay OR also influences the operation of the timing relays in determining the long and short pulses of the code.

For example, when relay OR operates to its reverse position on the first step of the code, it completes a circuit traced from terminal B at its reverse contact *b* through back contact *a* of timing relay O2L, back contact *a* of timing relay OLBP, and the winding of timing relay O1L to terminal N. When relay O1L picks up, its front contact *a* closes to complete a circuit from terminal B at reverse contact *b* of relay OR through the winding of relay O2L to terminal N, so that relay O2L is also energized and picks up. When relay O2L picks up, it completes an obvious stick circuit over its own front contact *a*, the opening of its back contact *a* at the same time interrupting the energizing circuit for relay O1L. However, all of the relays of the timing chain have slow release characteristics, and the release times are further lengthened by the rectifier snubs. Thus relay O1L, although deenergized, holds up for a considerable time. With both relays O1L and O2L picked up, a circuit is completed from terminal B through front contacts *b* of these two relays, in series, and the winding of timing relay OLP to terminal N, so that relay OLP is energized and picks up. Closing of front contact *a* of relay OLP completes an obvious circuit for energizing the timing relays OLB and OLBP. When these two relays pick up, relay OLBP is then energized over a circuit including front contact *a* of relay OLB so that these relays release successively when relay OLP releases.

When relay O2L picks up during the first step of the control code, its front contact *c* closes to shift the energizing circuit for relay O1L from reverse contact *b* of relay OR to normal contact *b*. Subsequently, front contact *a* of relay OLBP closes to maintain this latter connection for relay O1L until the code is terminated. It follows, then, that relays O1L and O2L are energized alternately, relay O1L over normal contact *b* and relay O2L over reverse contact *b* of relay OR, in response to the periodic operation of the armature of relay OR. Relays O1L and O2L remain picked up for the duration of short code pulses, relay O1L releasing during each odd numbered long code step and relay O2L releasing during each even numbered long step. These relays serve therefore to indicate code character in a code and together with relay OLP serve to control the length of the long steps of a code generated by the associated transmitter relays O1T and O2T. Relay OLB and its repeater relay OLBP are bridging relays. Each maintains its front contacts closed for the duration of a code and serves to prepare various local circuits when the code operation of relay OR begins and to open them when it stops.

When relay O1L picks up and closes its front contact *c*, a circuit is completed for energizing the first counting chain relay O1. This circuit may be traced from terminal B over reverse contact *a* of relay OR, back contact *b* of relay OLBP, front contact *c* of relay O1L, wire 34, and the winding of relay O1 to terminal N. When relay OLBP eventually picks up, its front contact *b* closes to transfer the energy from wire 34 to wire 35 and thence over back contact *b* of the second counting relay O2, front contact *a* of relay O1, and the winding of relay O1 to terminal N to stick up the first counting relay. When relay OR is operated to its normal position on the subsequent code step, a circuit is completed from terminal B over normal contact *a* of relay OR, front contact *c* of relay OLBP, wire 36, back contact *a* of relay O8, front contact *b* of relay O1, and the winding of relay O2 to terminal N. Relay O2 is thus energized and picks up, opening its back contact *b* to interrupt the stick circuit of relay O1 which then releases. When relay OR again returns to its reverse position, relay O3 is energized over a circuit which may be traced from the terminal B at reverse contact *a* of relay OR through front contact *b* of relay OLBP, wire 35, back contact *a* of relay O1, front contact *b* of relay O2, and the winding of relay O3 to terminal N. The remaining relays of the counting chain are energized in a similar manner as relay OR alternately operates to its normal and reverse positions. When relay O8 is energized, a chain repeating relay OCR is also energized to establish circuits to reuse the counting chain relays O1 to O7 inclusive. As described in the previously mentioned Miller patent, as many additional counting relays as are required for the coding action may be added to the counting chain. However, as herein shown only the usual relays O1 to O8 are indicated. The code stopping relay OCS is energized in a similar manner on the selected last step of the code, regardless of the length of the code, as is described in the Miller patent. The picking up of the relay OCS halts all coding action and initiates the reset action which returns the coding unit to its normal, at-rest condition.

The coding action of the office coding unit is initiated by the closing of a "start" contact shown on Fig. 3*b*. The start contact may be a push button contact which is manually closed or it may be a relay contact or any other similar means which may be closed as desired to start the coding action. In the preferred form, the start contact is a contact of the starting relay which is energized by a manually operated push button in the control apparatus. The start relay then sticks up until released at the proper time during the coding action. The closing of the indicated "start" contact initiates the coding action by energizing the office master relay OM. This circuit may be traced from terminal B over the start contact, wire 37, back contacts *d* of relay O2L and O1L, and the winding of relay OM to terminal N. When relays OLB and OLBP pick up, a stick circuit is established for relay OM which may be traced from terminal B through back contact *d* of relay OCS, wire 38, front contact *d* of relay OLBP or front contact *b* of relay OLB, front contact *a* and the winding of relay OM to terminal N. Since relays OLB and OLBP remain picked up during the entire code, relay OM thus is energized and remains picked up also during the entire coding action. Relay OM has slow release characteristics which are lengthened by a rectifier snub, so that once it has picked up, it bridges the time between the opening of back contact *d* of relay O1L in the pick up circuit and the closing of front contact *b* of relay OLB in the stick circuit. In other words, relay OM will hold up because of its slow release characteristics from the time back contact *d* of relay O1L in its pickup circuit opens until the time that front contact *b* of relay OLB in its stick circuit is closed.

When relay OM picks up, it completes a circuit for energizing relay O1T, which then picks up. This circuit may be traced from terminal B at back contact *c* of relay OCS through the back contacts *c* of all the old numbered counting chain relays, wire 39, front contact *b* of relay OM, back contact *b* of relay O2T, and the winding of relay O1T to terminal N. This circuit serves as a pulsing circuit to control the coding action of relay O1T during the short code steps, the odd numbered counting relays picking up to end or begin the various short pulses. When relay O1T picks up and closes its front contact *a*, it completes a stick circuit by which the long code steps are created. During the station selection part of the coding action, the stick circuit extends from front contact *a* of relay O1T over wire 40 and one of the front contacts *d* of relays O3, O5, or O7, to the station selection portion of the control circuit, not shown in this application. Then during the latter part of the code, the stick circuit is transferred by the pick up of relay OCR to the circuit traced over front contact *e* of relay O1L or front contact *b* of relay OLP, wire 41, front contact *b* of relay OCR, and the front contacts *e* of the various odd numbered counting chain relays to the function control circuits which may be manually set as desired by the local operator.

When relay O1T picks up, closing of its front contact *e* completes an obvious circuit for energizing the second transmitter relay O2T, which then picks up. Closing of front contact *a* of relay O2T prepares for the establishing of any one of several stick circuits, when relay O1T releases, by which the long even numbered code steps are determined. During the station selection part of the code, the stick circuit extends from the winding of relay O2T over back contact *e* of relay O1T, front contact *a* of relay O2T, and wire 42 to the front contacts *c* of the counting chain relays O2, O4, O6, and O8, and thence to the station selection control circuits, not shown in this application. During the latter part of the code, the stick circuit is transferred by relay OCR from wire 42 over front contact *e* of relay O2L or front contact *c* of relay OLP, these two front contacts being in multiple, wire 43, and front contact *c* of relay OCR to the front contacts *d* of the various even numbered counting chain relays, with the exception of relay O8, and thence to the various control function circuits which are manually set to make the even numbered steps of the code long as required for the desired controls.

The control coding action of the office line coding unit is halted by the office code stopping relay OCS which is energized and picks up during the selected last step of any code. As is explained in the previous mentioned Patent 2,698,425, only the even numbered code steps may be selected as a last step of the code. When back contact *d* of relay OCS opens, relay OM is deenergized by this interruption of its stick circuit and shortly releases. Opening of back contact *c* of relay OCS interrupts the pulsing circuit for relay O1T and this relay remains released when relay O2T again releases. Since relay O1T remains released, the office line relay OR then remains in its normal position which it has been occupying during this last step of the code. This causes the timing chain relays to release in order beginning with relay O2L whose stick circuit is interrupted at reverse contact *b* of relay OR. The release of the timing relays follows in the order OLP, OLB, OLBP, and finally relay O1L. Although the circuit is not shown in detail in this application, the code stopping relay OCS remains energized through a stick circuit which is not opened until relay OLB releases. Thus relay OCS remains up during the major portion of the resetting action of the office coding unit. When relay OLBP releases, it conditions the office line coding unit to normal and the following release of relay O1L conditions the unit to accept or transmit a new code.

I shall next discuss briefly the receipt of an indication code by the office coding unit. The transmission of such an indication code by a field station has been briefly but sufficiently discussed hereinbefore. In the direct current line circuit shown in Fig. 3*a*, the initial shunt on the line circuit at the field station causes office line relay OR to operate to its reverse position. In other words, the initial change in the line current flowing through the primary windings of transformer RT causes a pulse of current in the secondary winding which energizes the top winding of relay OR in such a manner that the relay operates to its reverse position. If a carrier line circuit such as shown in Fig. 2 is in use, the first pulse of carrier current from the remote line station operates relay OC to its normal position, closing its normal contact *a* to complete a circuit, previously traced and including the back contact *c* of relay OM, to energize the top winding of relay OR in such a direction that this relay operates to its reverse position. Thus whether a direct current or a carrier current line circuit is in use, the first code pulse from the field station causes the office line relay to occupy its reverse position.

Closing of the reverse contacts of relay OR causes the timing chain to operate in the manner which was previously described, and initiates the operation of the counting chain relays, as hereinbefore discussed. Closing of the reverse contacts of relay OR also energizes line pole-changing relay PC. This circuit may be traced from terminal B at reverse contact *a* of relay OR through back contact *e* of relay OLBP, back contact *e* of relay OM, wire 44, back contact *e* of relay OCS, wire 45, and the winding of relay PC to terminal N. When relay PC picks up, closing of its front contact *e* energizes its repeater relay PCP, which then picks up. The closing of front contact *a* of relay PC completes a stick circuit for this relay traced from terminal B at its front contact *a* over front contact *e* of relay OLBP, and thence through the remainder of the pick up circuit previously described. If a direct current line circuit is in use, contacts *b* and *c* of relay PC pole-change the current supplied to the line circuit to lock out all of the field stations except the one that is transmitting the indication code. During this pole-changing action, the secondary winding of the transformer RT is shunted momentarily. This circuit may be traced from the top terminal of the secondary winding of transformer RT through back contact *c* of relay PCP, front contact *d* of relay PC, and terminal 28 to the lower terminal of the secondary winding. When relay PCP picks up, this shunt is interrupted. In addition to this shunt applied to the secondary winding of the impulse transformer in order to stabilize relay OR, a circuit is also completed through the lower winding of relay OR to likewise hold this relay in its reverse position. This circuit may be traced from terminal O of the local battery through the lower winding of relay OR, back contacts *d* of relays O1T and OM, front contact *f* of relay PC, and back contact *b* of relay PCP to terminal B of the source. It is obvious that the current flowing in this circuit through the lower winding of relay OR is in the direction opposite to the arrow so that relay OR remains in its reverse position. If a carrier line circuit is in use, the pick up of relay PC serves to connect the carrier transmitting relay TC to front contact *b* of relay OCS. This circuit may be traced, in Fig. 2, from the winding of relay TC through terminal 26, front contact *b* of relay PC, back contact *b* of relay O1T, and terminals 23 and 27 to front contact *b* of relay OCS. The utility of this circuit will appear shortly during the discussion of the ending of the indication code.

The office coding action during the indication code then continues as controlled by the operation of relay OR, which follows exactly the indication code being transmitted by the field station. During the selected final step of this indication code, relay OCS at the office is again energized and picks up as described during the control code. This relay upon picking up establishes its stick circuit which is not interrupted until relay OLB of the timing chain releases during the reset action. Opening of back contact *e* of relay OCS deenergizes relay PC by interrupting its stick circuit and this relay releases. The release of relay PC deenergizes relay PCP but this relay, having slow release characteristics, holds up for a period after its deenergization. Release of relay PC also restores the direct current line circuit to its normal polarity. Again during this pole-changing action, the secondary winding of the impulse transformer is shunted so that the change in current in the line circuit will have no effect upon relay OR. This shunt may be traced in a manner similar to the previous shunt from the upper terminal of the secondary winding over front contact *c* of relay PCP and back contact *d* of relay PC to the lower terminal of the secondary winding. Relay OR is also held in its normal position by current flowing through its lower winding in the circuit traced from terminal O through the lower winding of relay OR, back contacts *d* of relays O1T and OM, back contact *f* of relay PC, and front contact *a* of relay PCP to terminal N. This current flow is in the proper direction to hold relay OR in its normal position. With relay OR remaining steadily in its normal position, the timing chain relays reset as was described at the end of the control code, the relays releasing in the order O2L, OLP, OLB, OLBP, and O1L. As before, release of relay OLBP resets the office coding unit to its normal condition and upon release of relay O1L, the entire unit is conditioned for further coding action.

If a carrier line circuit is in use, the pick up of relay OCS energizes relay TC. This circuit may be traced from terminal B at normal contact *a* of relay OR through wire 47, front contact *b* of relay OCS, wire 48, terminal 27, and as shown on Fig. 2, thence to terminal 23, back contact *b* of relay O1T, front contact *b* of relay PC, and the winding of relay TC to terminal N. When relay TC operates to its normal position, a pulse of control carrier current is transmitted over the line circuit to reset the remote line station and thus restore the remote direct current line circuit beyond this remote line station to normal. This pulse of carrier current is terminated when relay PC releases to open its front contact *b* and deenergize relay TC.

It is to be seen, then, that the normal reset and synchronizing action for a control code or an indication code, whether a direct current or carrier current line circuit is in use, takes place without any additional relays over those furnished in the office coding unit. The usual terminal connections which are required for a carrier current line circuit or for a direct current line circuit are sufficient to also provide the necessary connections for the various normal resetting and synchronizing actions for such a line circuit.

I shall next described how the system is restored to normal in the case of a fault.

It is to be remembered that in case of a fault either in the coding equipment or in the communication channel itself, the problem is to reset all of the coding units at the office and the various field stations in a similar manner at the same time. This is done generally by assuring that all of the station line relays R and the office line relay OR are in their reverse position and that the timing relays have had time to reset in this condition. Then all of the line relays are placed normal simultaneously or as nearly so as possible and the timing relays are allowed to reset at the same time both in the office and at the field station. The simultaneous resetting of the timing relays with the line relays in their normal position synchronizes the various coding units and conditions them for further coding action at the same time.

A control code may be halted on an odd numbered step due to a fault. For example, relay O1T may be held energized over one of the wires 39, 40, or 41. In this case relay OR is then held in its reverse position and the timing relays O1L, OLP, OLB, and OLBP release. With relay OR held in its reverse position, timing relay O2L remains energized and picked up. The release of relay OLBP deenergizes relay OM and also opens and resets the counting and selecting relay circuits. The release of relay OM while relay OR is in its reverse position completes the previously described circuit for energizing relay PC which then picks up and in turn energizes relay PCP. The release of relay OM deenergizes relay O1T. However, this latter relay, having slow release characteristics, remains up for a period of time before releasing.

With relay O1T picked up, the direct current line circuit stays open at this time. If a carrier current line circuit is in use, relay TC remains energized during the period relay O1T holds up whether relay PC is picked up or released. The circuits over which relay TC remains energized are shown in Fig. 2 and are obvious by inspection of that drawing. Thus at each field station, line relay R remains in its released or reverse position and the timing relays release in the same order as at the office, relay 2L remaining energized. The release of relay LBP at each field station opens the counting and selecting relay circuits to prevent further reception of any code. This action occurs whether the line circuit is direct current or carrier current controlled from the office.

When relay PCP picks up, relay OR is energized, so that it operates to normal, by current flowing in the circuit traced from terminal O through the lower winding of relay OR, back contacts *d* of relays O1T and OM, front contact *f* of relay PC, front contact *b* of relay PCP, and back contacts *f* of relays OLBP and O1L to terminal N. The eventual release of relay O1T closes the direct current line circuit but the field line relays do not immediately operate to their normal position because the polarity of the line current is still reversed by contacts *b* and *c* of relay PC. In the carrier line circuit, the release of relay O1T opens the usual energizing circuit for relay TC. But since the relay OR occupies its normal position at this time, another circuit is completed for energizing relay TC so that the line relays at the various field stations remain in their released position. This circuit for energizing relay TC may be traced from terminal B at normal contact *a* of relay OR through wire 47, back contact *b* of relay OCS, wire 49, back contacts *g* of relays O1L and OLBP, terminal 27, and as shown on Fig. 2, terminal 23, back contact *b* of relay O1T, front contact *b* of relay PC, and the winding of relay TC to terminal N.

When relay OR occupies its normal position, the office timing relay chain is reenergized and the various relays pick up. The opening of reverse contact *a* of relay OR deenergizes relay PC which releases before its stick circuit is completed by closing of the front contact *e* of relay OLBP. The release of relay PC deenergizes relay PCP and, with the carrier line circuit, relay TC. With relay OR steadily occupying its normal position, the office timing relays then release in the normal order due to the deenergization of relay O2L relay O1L being the last to release. At the same time, the line current in the direct current line circuit system is restored to its normal polarity by the release of relay PC and the station line relays return to their normal position. In the carrier line circuit, with the release of relay TC, the station line relays return to their normal position. In either case, the timing relays at the field stations are reenergized and then release in order under the normal condition, relay 1L at each field station being the last to release. Thus the coding units at the office and at each field station are returned to their normal condition at substantially the same time so that synchronization of the line circuit, whether carrier or direct current controlled, is obtained.

If a control code is terminated on an even numbered code step prior to the selected final step, due to the failure of relay O1T to pick up, office line relay OR is held normal and the office timing relays release in the normal order. Relay OLBP releases the counting and selecting relays and also releases relay OM. Relay O1L is as usual the last to release. The station line relays R on either type of line circuit remain steadily energized and their timing relays release in the normal order as at the end of a complete code, relay 1L being the last to release. The entire action in case of fault such as this is similar to that occurring at the end of a normal control code, except relay OCS is not energized, and synchronization of all stations and the office is maintained in the usual manner.

If an indication code stalls on an odd numbered step, as for example would be the case if relay 1T at the field station remained picked up due to a fault, the office line relay OR remains reverse until the timing chain relays release under this reverse condition, relay O2L remaining picked up. Relay OR is then restored to its normal position by the closing of back contact *f* of relay OLBP. The circuit controlling this action may be traced from terminal O of the source through the lower winding of relay OR, back contacts *d* of relays O1T and OM, front contact *f* of relay PC, front contact *b* of relay PCP, and back contacts *f* of relays OLBP and O1L to terminal N of the source. Relays PC and PCP are already in their picked up position since the office was receiving an indication code. When relay OR moves to its normal position, relay PC is deenergized by the opening of reverse contact *a* of relay OR, the opening of front contact *e* of relay OLBP having already opened the stick circuit for relay PC. If a direct current line circuit is in use, the release of relay PC restores the normal polarity to the line current. All the field line relays, including the one at the field station which had been transmitting, return to their normal position at this time and the station coding units reset simultaneously from this normal condition. When relay OR operated to its normal position, the timing chain at the office was reenergized and then releases in its normal order, relay O1L being the last to release. Since all the line relays operated to their normal position at nearly the same time, the reset action in the office and the field stations on a direct current line circuit is synchronized.

If a carrier current line circuit is in use, relay TC is energized when line relay OR occupies its normal position. The circuit for energizing relay TC may be traced from terminal B at normal contact *a* of relay OR through wire 47, back contact *b* of relay OCS, wire 49, back contacts *g* of relays O1L and OLBP, terminal 27, terminal 23, back contact *b* of relay O1T, front contact *b* of relay PC, and the winding of relay TC to terminal N. The pulse of carrier current which is transmitted when relay TC operates to its normal position assures that all of the station line relays R are in their reverse position by opening the remote direct current line circuit at the remote line station. The release of relay PC immediately thereafter deenergizes relay TC which releases to again suppress the carrier current. The remote direct current line circuit is thus closed with the polarity of the line current now normal and all the station line relays operate to their normal position. This occurs at the same time as, or very shortly after, the office line relay OR operates to its normal position. All of the station coding units then reset from this normal position of the line relays substantially in synchronism with the office coding unit.

If an indication code stalls on an even numbered code step other than the selected last step of the code, as a result of the failure of relay 1T at the field station to pick up, relay OR remains normal and the timing relays O2L, OLP, OLB, and OLBP release. At the field station which was transmitting, relay R remains picked up and the timing relays 2L, LP, LB, and LBP release. Relay LB at the field station releases the master relay M which reverses the line connections for relay R at that station so that the line relay operates to its reverse position reenergizing the timing relays which then release in the order 1L, LP, LB, and LBP. The apparatus at the transmitting field station thus assumes the same condition as at the other field stations where the timing chain relays stand released in their reverse condition with relay 2L picked up.

At the office, release of relay OLBP deenergizes relays PC and O1L. Relay PC releases before relay O1L, which is of the slow release type. This action energizes a lockout and synchronizing relay XS. The circuit for energizing relay XS may be traced from terminal B at back contact *e* of relay PC through front contact *d* of relay PCP (still closed), front contact *h* of relay O1L, back contact *h* of relay OLBP, back contact *f* of relay O2L, and the winding of relay XS to terminal N. When relay XS picks up, a circuit is completed from terminal B at front contact *b* of relay XS over back contact *b* of relay OM, back contact *b* of relay O2T, and the winding of relay O1T to terminal N. Relay O1T is energized through this circuit and picks up. The pick up of relay O1T energizes relay O2T in a manner previously discussed and this relay also picks up. When relay O2T picks up, the circuit for energizing relay O1T is transferred to front contact *b* of relay O2T and front contact *a* of relay O1T, and relay O1T remains energized and in its picked up position.

Closing of front contact *d* of relay O1T completes an obvious circuit through the lower winding of relay OR to cause it to operate to its reverse position. This action reenergizes the office timing chain relays and relay PC, causing all of these relays to pick up. When relay OLBP picks up, the closing of its front contact *h* completes a stick circuit for relay XS which may be traced from terminal B through front contact *h* of relay OLBP, front contact *a*, and the winding of relay XS to terminal N. If the line circuit is direct current controlled, the pick up of relay O1T opens the line circuit at its back contacts *b* and *d*, which assures that all line relays R are released. If the line circuit is carrier current controlled, the pick up of relay O1T immediately energizes relay TC through an obvious circuit including front contact *c* of relay O1T and back contact *c* of relay PC. When relay PC picks up, the energizing circuit for relay TC is transferred to the front contacts *b* of relays O1T and PC. Relay TC thus operates to its normal position and a pulse of carrier current is transmitted over the line circuit to the remote line station. This causes the remote direct current line circuit to be opened at reverse contact *a* of relay C to assure that all of the station line relays are released.

With office line relay OR remaining in its reversed position, the office timing chain relays then release beginning with relay O1L and including OLP, OLB, and OLBP in sequence, relay O2L remaining in its picked up position. Release of relay OLBP opens the stick circuit for relay XS which then releases. This deenergizes relay O1T which also releases. The release of relay O1T causes relay OR to operate to its normal position. This circuit may be traced from terminal O through the lower winding of relay OR, back contacts *d* of relays O1T and OM, front contact *f* of relay PC, front contact *b* of relay PCP, and back contacts *f* of relays OLBP and O1L to terminal N. Operation of relay OR to its normal position deenergizes relay PC, which releases, and also energizes the timing chain relays in the office unit. The office line coding unit now begins to reset from this normal condition with relay O1L being the last of the timing chain relays to release.

In the direct current line circuit, release of relay O1T closes the line circuit and the following release of relay PC restores the polarity of the line current to normal. All of the station line relays then operate to their normal position including the relay at the field station which was transmitting the indication code. At each station the timing chain and the rest of the line coding unit reset in the usual manner with line relay R in its normal position. If a carrier line circuit is in use, release of relay PC deenergizes relay TC which returns to its reverse position suppressing the carrier current. At the remote line station, the absence of the carrier current causes relay C to return to its reverse position closing the remote direct current line circuit. Since the direct current in the remote line circuit has normal polarity, all station line relays operate to their normal position and the line coding units reset under this condition. Thus in either case, all of the line relays R and the office line relay OR are returned to their normal position at substantially the same time and the coding units at the office and all of the field stations reset to their normal at-rest conditions in synchronism.

It will be seen that in each case, when the coding action is halted or stalled due to some fault in the equipment or the communication channel, regardless of their initial positions, the line relays OR and R are restored to their normal position at substantially the same time so that each may release its timing relay chain in the normal order to place all of the coding units in the proper receiving condition before relay O1L at the office or any of the relays 1L at the stations release to permit the initiation of a new code. Generally, the office coding unit has a preferred chance to send the next code because relay O1L releases slightly before the field relays 1L release.

When the system is in its normal or at-rest condition, the office line relay OR may be operated as the result of one or more impulses of foreign current or as the consequence of a temporary fault in the communication channel. In this case, the first reversal of relay OR energizes relay PC. Relay PC picks up and, in a direct current line circuit, causes the polarity of the line current to be reversed, which releases all the line relays R to prevent the initiation of a code by any station. In a carrier current line circuit, a similar impulse or line fault would also cause the operation of relay C at the remote line station. This operation of relay C opens the remote direct current line circuit which prevents the field stations on that line from initiating a code. When the interference terminates, the system restores to normal in the same manner as has been previously described in the case of an interrupted indication code, the actual operation being determined by the position of relay OR at the end of the fault period.

It has been shown then, as a result of the synchronizing circuits of my invention, that a remote control system to which these circuits have been applied will maintain synchronism between the office and all field station locations during normal operation and during the restoring action necessary to overcome a fault condition occurring in the equipment or in the line circuit or communication channel. This synchronizing action occurs in substantially the same manner whether the remote control system is using a direct current line circuit or a carrier current line circuit from the office location. Furthermore, no additional equipment, other than is supplied in the office line coding unit itself, is needed for either type of line circuit. With the proper connections to terminals provided on the office line coding unit, the synchronizing circuits work equally satisfactorily with either type of line circuit. In most cases, the connections for synchronizing required between the various terminals provided are those which are required for normal operation of the system for the type of line circuit in use. The system of my invention thus supplies a means for synchronizing remote control systems using either direct current or carrier current line circuits without requiring additional equipment. Furthermore, the synchronizing action is substantially the same at the office location and at all the field station locations for either type of line circuit.

Although I have herein shown and described but one form of my invention, it is to be understood that various changes and modifications may be made therein within the scope of the appended claims without departing from the spirit and scope of my invention.

Having thus described my invention, what I claim is:

1. In a remote control system, including an office and a plurality of stations connected by a communication channel, at least a portion of which is a direct current line circuit, said office and each said station being equipped with similar coding units for transmitting and receiving selective codes between said office and any one of said stations, each said coding unit having associated therewith a line relay operable to a normal and a reverse position to receive a selective code and to activate the corresponding coding unit, each said line relay occupying its normal position during intervals when there is no coding action over said communication channel and said coding units are in an at-rest condition; means to synchronize the resetting of said coding units to their at-rest condition if a code is interrupted by a fault, said means comprising a circuit means at said office effective initially to operate the office line relay to its reverse position if not already occupying that position and effective after a preselected period of time to operate said office line relay to its normal position, another circuit means at said office to effect the opening of the direct current line circuit portion for said preselected period of time to cause all station line relays to operate to their reverse position, and then to effect the closing of said direct current line circuit to cause all said station line relays to operate to their normal position at substantially the same time as said office line relay is operated to its normal position, thereby synchronizing the resetting action of all coding units to their at-rest condition.

2. In a remote control system, including an office and a plurality of stations connected by a communication channel, said office and each said station being equipped with a coding unit adapted to transmit and receive selective codes between the office and any one station, each said coding unit having associated therewith a line relay operable to a normal and a reverse position in response to a selective code to activate the corresponding coding unit, each said line relay occupying its normal position during periods when there is no coding action over said communication channel and all coding units are in their at-rest condition; in combination with the office coding unit, means to synchronize the reset action of all the coding units to their at-rest condition after a fault interrupts a selective code, said means comprising a first circuit means effective initially to operate the office line relay to its reverse position if not already in that position and effective after a preselected time interval to operate said office line relay to its normal position to activate the office coding unit to reset to its at-rest condition, and a second circuit means to effect the operation of all the station line relays to their reverse positions and at the end of said preselected time interval to effect the operation of all said station line relays to their normal position at substantially the same time as the office line relay operates to its normal position to activate each associated station coding unit to reset to its at-rest condition, thereby synchronizing the reset action of all said coding units.

3. In a remote control system, including an office and a plurality of stations connected by a communication channel, said office and each said station being equipped with a coding unit adapted to transmit and receive selective codes between the office and any one station, each said code comprising a selected plurality of alternate odd and even code steps, each said coding unit having associated therewith a line relay operable to a normal and a reverse position in response to said even and odd steps, respectively, of a selective code to activate the corresponding coding unit, each said line relay occupying its normal position during periods when there is no coding action over said communication channel and all coding units are in their at-rest condition; in combination with the office coding unit, means to synchronize the reset action of all coding units to their at-rest condition if a fault causes a code from one of said stations to stall on an even code step, said means comprising a synchronizing relay, a first circuit means including contacts responsive to the operation of said synchronizing relay to initially effect the operation of the office line relay to its reverse position and after a preselected time interval to effect its operation back to its normal position to activate the office coding unit to reset to its at-rest condition, and a second circuit means including other contacts responsive to the operation of said synchronizing relay to initially effect the operation of each station line relay to its reverse position and at the end of said preselected time interval to effect the operation of each station line relay to its normal position at substantially the same time as said office line relay operates to its normal position, thereby activating each station coding unit to reset to its at-rest condition in synchronism with the similar action of said office coding unit.

4. In a remote control system, including an office and a plurality of stations connected by a communication channel, said office and each said station being equipped with a coding unit adapted to transmit and receive selective codes between the office and any one station, each said code comprising a selected plurality of alternate odd and even code steps, each said coding unit having associated therewith a line relay operable to a normal and a reverse position in response to said even and odd steps, respectively, of a selective code to activate the corresponding coding unit, each said line relay occupying its normal position during periods when there is no coding action over said communication channel and all coding units are in their at-rest condition; in combination with the office coding unit, means to synchronize the reset action of all coding units to their at-rest condition if a fault causes a code to stall on an odd code step, said means comprising a first circuit means including contacts closed in response to the office line relay remaining in its reverse position, said first circuit means being effective to cause said office line relay to operate to its normal position a predetermined time interval after said code stalls to activate the office coding unit to reset to its at-rest condition, and a second circuit means including other contacts closed in response to said office line relay remaining in its reverse position and pole-changing contacts occupying their pole-changing position while said office line relay occupieces its reverse position, said other circuit means being effective to initially assure each said station line relay is occupying its reverse position and to cause each said station line relay to operate to its normal position at a substantially the same time as said office line relay, to activate each associated station coding unit to reset to its at-rest condition in synchronism with said resetting of said office coding unit.

5. In combination with an office coding unit, said office coding unit being part of a remote control system comprising an office and a plurality of stations connected by a communication channel at least a portion of which is a direct current line circuit, each station having a coding unit similar to said office coding unit, said coding units being adapted to transmit and receive selective codes over said communication channel, each said code comprising a plurality of odd and even numbered code steps, each coding unit having associated therewith a line relay operable during a code to a normal and a reverse position in response to said even and odd code steps, respectively, each said line relay occupying its normal position during the at-rest condition of said coding units when no code is being transmitted over said communication channel, said office coding unit further including a chain of timing relays responsive to the alternate operation of the office line relay and including an even drop-out relay and an odd drop-out relay which release during any even or odd code step, respectively, longer in duration than a predetermined short code interval; synchronizing means to control the resetting of said remote control system to its at-rest condition if a code from one of said stations stalls with the office line relay in its normal position, said synchronizing means comprising a synchronizing relay, an energizing circuit for said synchronizing relay including a back contact of said even drop-out relay and a front contact of said odd-drop out relay, a first circuit means including a front contact of said synchronizing relay to initially effect the operation of said office line relay to its reverse position and after a predetermined time interval longer in duration than the release time of said odd drop-out relay to effect the operation of said office line relay back to its normal position to activate the resetting of said office coding unit to its at-rest condition, and a second circuit means including contacts closed in response to the energization of said synchronizing relay to assure that all station line relays are occupying their reverse position and at the end of said predetermined time interval to effect the operation of each station relay to its normal position to activate the resetting of each station coding unit in synchronism with said resetting of said office coding unit.

6. In combination with an office coding unit, said office coding unit being part of a remote control system comprising an office and a plurality of stations connected by a communication channel at least a portion of which is a direct current line circuit, each station having a coding unit similar to said office coding unit, said coding units being adapted to transmit and receive selective codes over said communication channel, each said code comprising a plurality of odd and even numbered code steps, each coding unit having associated therewith a line relay operable during a code to a normal and a reverse position in response to said even and odd code steps, respectively, each said line relay occupying its normal position during the at-rest condition of said coding units when no code is being transmitted over said communication channel, said office coding unit including a chain of timing relays responsive to the alternate operation of the office line relay and including an even drop-out relay and an odd drop-out relay which release during any even or odd code step, respectively, longer in duration than a predetermined short code interval; synchronizing means to control the resetting of said control system to its at-rest condition if a code stalls with the office line relay in its reverse position, said synchronizing means comprising a first circuit means including a back contact of said odd drop-out relay to effect the operation of said office line relay to its normal position after a predetermined time interval to activate said office coding unit to reset ot its at-rest condition, and a second circuit means including another back contact of said odd drop-out relay, contacts closed in response to said office line relay operating to its normal position, and contacts opened in response to said office line relay operating to its normal position, said second circuit means assuring that each station line relay initially occupies its reverse position and being effective at the end of said predetermined time interval to cause each station line relay to operate to its normal position to activate its associated coding unit to reset to its at-rest condition in synchronism with the resetting of said office coding unit.

7. In a remote control system comprising an office and a plurality of stations connected by a communication channel at least a portion of which is a direct current line circuit, said office and each said station having a similar coding unit adapted to transmit and receive selective codes over said communication channel, a code from a particular station to said office being in indication code, each said code comprising a plurality of odd and even numbered code steps; each said coding unit having associated therewith a line relay and including a chain of timing relays, a pole-changing relay, and a transmitter relay; each said line relay being operable during a code to a normal and a reverse position in response to said even and odd code steps, respectively, and occupying its normal position during the at-rest condition of said remote system when no coding is occurring, the office timing chain relays being responsive to the operation of the office line relay both to its normal and to its reverse positions and including an even drop-out relay and an odd drop-out relay which release during any long even or odd code step, respectively, longer in duration than a predetermined short code interval, said office timing chain further including a bridging relay normally energized during a code and becoming deenergized and releasing after said office line relay has continuously occupied either of its positions for a predetermined time interval which is longer in duration than said long code step, the office transmitter relay being normally deenergized and the office pole-changing relay being normally energized during an indication code; in combination with said office coding unit, means to synchronize the resetting of said remote control system to its at-rest condition if an indication code stalls during an even code step, said means comprising a synchronizing relay; an energizing circuit for said synchronizing relay including a back contact of said even drop-out relay, a front contact of said odd drop-out relay, and a back contact of said bridging relay; a circuit including a front contact of said synchronizing relay to energize said transmitter relay, another circuit including a front contact of said transmitter relay effective to cause said office line relay to operate to its reverse position, a stick circuit including a front contact of said bridging relay effective to maintain said synchronizing relay energized for said predetermined time interval after said office line relay has operated to its reverse position, a third circuit including back contacts of said transmitter relay, said odd drop-out relay, and said bridging relay effective at the end of said predetermined time interval to cause said office line relay to operate to its normal position to activate the office coding unit to reset to its normal at-rest condition, a fourth circuit means including front and back contacts of said transmitter relay, said fourth circuit means being effective initially to cause all station line relays to operate to their reverse position and being effective at the end of said predetermined time interval to cause each station line relay to operate to its normal position to activate its associated station coding unit to reset to its at-rest condition substantially at the same time as said office coding unit to synchronize the resetting of said remote control system to its at-rest condition.

8. In a remote control system comprising an office and a plurality of stations connected by a communication channel at least a portion of which is a direct current line circuit, said office and each said station having a similar coding unit adapted to transmit and receive selective codes over said communication channel, a code from a particular station to said office being an indication code, each said code comprising a plurality of odd and even numbered code steps; each said coding unit having associated therewith a line relay, and a chain of timing relays, a pole-changing relay, and a transmitter relay; each said line relay being operable during a code to a normal and a reverse position in response to said even and odd code steps, respectively, and occupying its normal position during the at-rest condition of said remote system when no coding is occurring, the office timing chain relays being responsive to the operation of the office line relay both to its normal and to its reverse positions and including an even drop-out relay and an odd drop-out relay which release during any long even or odd code step, respectively, longer in duration than a predetermined short code interval, said office timing chain further including a bridging relay normally energized during a code and becoming deenergized and releasing after said office line relay has continuously occupied either of its positions for a predetermined time interval which is longer in duration than said long code step, the office transmitter relay being normally deenergized and the office pole-changing relay being normally energized during an indication code; in combination with said office coding unit, means to synchronize the resetting of said remote control system to its at-rest condition if an indication code stalls during an odd step, said means comprising a first circuit including back contacts of said odd drop-out relay and said bridging relay effective at the end of said predetermined time interval to cause said office line relay to operate to its normal position to activate said office coding unit to reset to its at-rest condition, a second circuit including front contacts of said pole-changing relay to assure that all station line relays are occupying their reverse position, and a third circuit including back contacts of said pole-changing relay effective to cause each said station line relay to operate to its normal position at substantially the same time as said office line relay operates to its normal position, thereby activating each station coding unit to reset to its at-rest condition in synchronism with the resetting action of said office coding unit.

9. In a remote control system comprising an office and a plurality of stations connected by a direct current line circuit, said office and each said station equipped with similar coding units adapted to transmit and receive selective codes, each coding unit having associated therewith a line relay, the office line relay being operable to a normal and a reverse position, each station line relay being operable to a normal position when said line circuit is energized with direct current having a given polarity and biased to a reverse position when said line circuit is deenergized or is energized with direct current having the polarity opposite to said given polarity, said office line relay and each said station line relay operable during a selective code to activate the corresponding coding unit to transmit or receive the code, each line relay occupying its normal position during the at-rest condition of said remote control system when here is no coding action; in combination with the office coding unit, synchronizing means at said office location to control the resetting of said remote control system to the at-rest condition if a code is interrupted by a fault, said means comprising a circuit means effective to initially cause the operation of said office line relay to its reverse position if not already occupying that position and effective after a predetermined time interval to operate said office line relay to its normal position to activate said office coding unit to reset to its at-rest condition, another circuit means effective to energize said direct current line circuit with current having said opposite polarity to assure that all station line relays occupy their reverse position and effective at the end of said predetermined time interval to energize said direct current line circuit with direct current of said given polarity to operate each said station line relay to its normal position at substantially the same time as said office line relay to activate the corresponding station coding unit to reset to its at-rest condition in synchronism with said office coding unit.

10. In a remote control system comprising an office and a plurality of stations connected by a direct current line circuit, said office and each station equipped with similar coding units adapted to transmit and receive selective codes comprising a plurality of odd and even code steps, each coding unit having associated therewith a line relay operable during a selective code to activate the corresponding coding unit according to said code, said office line relay being operable to a normal and a reverse position, each station line relay being operable to a normal position when said line circuit is energized with direct current having a given polarity and biased to a reverse position when said line current is deenergized or is energized with direct current having the polarity opposite to said given polarity, each said line relay occupying its normal position during the at-rest condition of said remote control system when there is no coding action, the office coding unit including a chain of timing relays, a line current pole-changing relay which when energized causes the line current to have said opposite polarity, and a transmitter relay, said timing chain including an even drop-out and an odd drop-out relay which release when an even code step or an odd code step, respectively, is longer in duration than a preselected short code interval, and a bridging relay normally energized during a code and becoming deenergized and releasing if said office line relay remains in one position for a predetermined time interval which is longer than said long code step time; in combination with said office coding unit, synchronizing means at said office location to control the resetting of said remote control system to its at-rest condition if a fault interrupts any code, said means comprising a circuit means effective to initially cause the operation of said office line relay to its reverse position if not already occupying that position to activate said office coding unit to release said timing chain under the reverse condition, said circuit means being further effective at the end of said predetermined time interval to cause said office line relay to operate to its normal position to activate said office coding unit to reset to its at-rest condition, said circuit means including at times a front contact of said transmitter relay and at other times back contacts of said odd drop-out relay and said bridging relay, another circuit means effective by energizing said line circuit with direct current having said opposite polarity to assure that all station line relays occupy their reverse position to activate the station coding units to release in the reverse condition, said other circuit means further being effective at the end of said predetermined time interval by energizing said line circuit with direct current having said given polarity to cause each said station line relay to operate to its normal position at substantially the same time as said office line relay to activate the associated station coding unit to reset to its at-rest condition in synchronism with the reset action of said office coding unit, said other circuit means including pole-changing contacts of said line current pole-changing relay, and a circuit including a reverse contact of said office line relay to hold said pole-changing relay energized until the end of said predetermined time interval.

11. In a remote control system comprising an office and a plurality of stations connected by a communication channel, at least the first portion of which is adapted to carrier currents, said office and each station equipped with similar coding units adapted to transmit and receive selective codes comprising a plurality of odd and even code steps, each coding unit having associated therewith a line relay operable to normal and reverse positions during a selective code to activate the associated coding unit according to said code, each said line relay occupying its normal position during the at-rest condition of said remote control system when no coding occurs, the office coding unit further having associated therewith a carrier transmitter relay normally deenergized which when energized causes carrier current to be transmitted from said office over said communication channel, said communication channel being so adapted that each station line relay operates to its reverse position when carrier current is transmitted from said office, said office coding unit including a chain of timing relays, a pole-changing relay, and a transmitter relay, said timing relays including an even drop-out and an odd drop-out relay which release when an even or an odd code step, respectively, is longer in duration than a preselected short code interval, and a bridging relay normally energized during a code and becoming deenergized and releasing if said office line relay remains in one position for a predetermined time interval which is longer than said long code step time; in combination with said office coding unit, synchronizing means at said office to control the resetting of said system to its at-rest condition if a fault interrupts any code, said synchronizing means comprising a circuit means effective to initially cause the operation of said office line relay to its reverse position if not already occupying that position to activate said office coding unit to release its timing chain under this reverse condition, said circuit means further being effective at the end of said predetermined time interval to cause said office line relay to operate to its normal position to activate said office coding unit to reset to its at-rest condition, said circuit means including at times a front contact of said transmitter relay and at other times back contacts of said odd drop-out relay and said bridging relay, said synchronizing means further comprising another circuit means effective to assure that all station line relays occupy their reverse position to activate the associated station coding units to release under this reverse condition, said other circuit means being effective at the end of said predetermined time interval to cause each said station relay to operate to its normal position at substantially the same time as said office line relay to activate each said associated station coding unit to reset to its at-rest condition in synchronism with said office coding unit, said other circuit means including an energizing circuit for said carrier transmitter relay, which includes contacts of said pole-changing relay and at times another front contact of said transmitter relay, and at other times other back contacts of said odd drop-out relay and said bridging relay, said pole-changing relay contacts being operable at the end of said predetermined time interval to deenergize said carrier transmitter relay.

No references cited.